(12) United States Patent
Cho et al.

(10) Patent No.: US 7,761,781 B2
(45) Date of Patent: Jul. 20, 2010

(54) WEB BROWSING METHOD AND SYSTEM, AND RECORDING MEDIUM THEREOF

(75) Inventors: Kyung-hwan Cho, Incheon (KR); Tae-wook Nam, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 313 days.

(21) Appl. No.: 11/511,475

(22) Filed: Aug. 29, 2006

(65) Prior Publication Data
US 2007/0067333 A1   Mar. 22, 2007

(30) Foreign Application Priority Data
Sep. 22, 2005   (KR) ............... 10-2005-0088220

(51) Int. Cl.
*G06F 17/00* (2006.01)
(52) U.S. Cl. .................. 715/206; 715/246; 345/660
(58) Field of Classification Search ............ 715/206, 715/246; 345/660
See application file for complete search history.

(56) References Cited

U.S. PATENT DOCUMENTS

| 6,457,060 B1* | 9/2002 | Martin et al. ............... 709/245 |
|---|---|---|
| 2002/0032699 A1* | 3/2002 | Edwards et al. ............. 707/513 |
| 2002/0186262 A1* | 12/2002 | Itavaara et al. .............. 345/864 |
| 2003/0001884 A1 | 1/2003 | Liu |
| 2004/0117349 A1* | 6/2004 | Moricz ........................... 707/1 |
| 2005/0195221 A1* | 9/2005 | Berger et al. ................. 345/660 |
| 2005/0210399 A1* | 9/2005 | Filner et al. .................. 715/767 |

FOREIGN PATENT DOCUMENTS

| JP | 11-224146 A | 8/1999 |
|---|---|---|
| KR | 10-2001-0081611 A | 8/2001 |
| KR | 10-2002-0078260 A | 10/2002 |

OTHER PUBLICATIONS

Staffan Bjork et al., WEST: A web Browser for Small Terminals, 1999, The ACM Digital Library, 187-196.*
Chen et al., Detecting Web Page Structure for Adaptive Viewing on Small Form Factor Devices, May 20-24, 2003, ACM, pp. 225-233.*

* cited by examiner

*Primary Examiner*—Boris Pesin
*Assistant Examiner*—Shen Shiau
(74) *Attorney, Agent, or Firm*—Sughrue Mion, PLLC

(57) ABSTRACT

A web browsing method and system capable of easily selecting a hyperlink, and a recording medium thereof. The method includes: dividing a web page into regions based on the table structure of the web page; determining a specific hyperlink from hyperlinks in the web page based on information set in advance according to the user usage pattern; displaying the web page with identification information allocated to each region and the specific hyperlink. If a region is selected based on the identification information, displaying a web page with hyperlinks in the selected region. If a hyperlink is selected based on the web page with the hyperlinks or the specific hyperlink is selected, moving from the displayed the web page to data connected to the selected hyperlink, and at the same time updating the set in advance information.

19 Claims, 15 Drawing Sheets

SELECT 7TH REGION

LATEST HOT TOPICS ①
- "OH, WHIRL! – A BRIDGE BREAKING A STEREOTYPED IDEA." ②
- FREE iPOD ON THE STREET! – CHEATED ③
- CARRYING A BABY IN DIFFERENT SCALES – SPACESHIP AND JET PLANE? ④
- WEIRD ADDITION – RAP SONG OF CONFUCIUS ⑤

STORY OF THREE MC KINGDOMS

LATEST HOT TOPICS①
• "OH, WHIRL! – A BRIDGE BREAKING A STEREOTYPED IDEA." ②
• FREE iPOD ON THE STREET! – CHEATED ③
• CARRYING A BABY IN DIFFERENT SCALES – SPACESHIP AND JET PLANE? ④
• WEIRD ADDITION – RAP SONG OF CONFUCIUS ⑤
STORY OF THREE MC KINGDOMS

SPECIFIC HYPERLINK

WEB BROWSING METHOD AND SYSTEM, AND RECORDING MEDIUM THEREOF

CROSS-REFERENCE TO RELATED PATENT APPLICATIONS

This application claims priority from Korean Patent Application No. 10-2005-0088220, filed on Sep. 22, 2005, in the Korean Intellectual Property Office, the entire disclosure of which is incorporated herein by reference.

BACKGROUND OF THE INVENTION

1. Field of the Invention

Methods and systems consistent with the present invention relate to web browsing, and more particularly, to a web browsing method and system allowing easier selection of a hyperlink in a web page, and a recording medium thereof.

2. Description of the Related Art

According to a related art known web browsing method, searching of the Internet or web surfing is performed using a web browser such as Internet Explorer. Accordingly, in the conventional web browsing method, a desired hyperlink among hyperlinks in a web page is selected using a mouse connected to an apparatus such as a personal computer (PC) for which the mouse is an information input unit or a command input unit.

Meanwhile, as the boundary between electronic appliances, such as digital televisions (TVs) and mobile phones, and PCs has been collapsing recently, the trend is for functions previously available only in a PC to now be enabled in digital TVs and mobile phones. A web browsing function, for example, is now present in some digital TVs and mobile phones.

Unlike the PC, digital TVs and mobile phones use information input units having a limited number of buttons. Consequently, the ease of use associated with web browsing using a PC having a mouse as an information input unit cannot be expected when using digital TVs and mobile phones.

In case of the PC, a hyperlink in a web page can be selected easily and quickly using the mouse as described above, but in the suggested conventional web browsing method using a digital TV or a mobile phone, a hyperlink in a web page is selected using a direction button on the information input unit. Accordingly, in the digital TV or mobile phone using the conventional method, buttons must be pressed many times in order to select a desired hyperlink. Easy and rapid selection of the hyperlink cannot be expected.

In order to improve the web browsing experience on digital TVs, mobile phones, and other electronic appliances, a web browsing method is suggested by which numbers are sequentially allocated to respective hyperlinks in a web page and, based on number information input using number buttons, a hyperlink is selected. In this web browsing method, however, if the number of hyperlinks included in a web page is large, the numbers required to be allocated increase. Accordingly, areas to display these should be secured and management of numbers allocated to respective hyperlinks becomes complicated.

SUMMARY OF THE INVENTION

Exemplary embodiments of the present invention may overcome the above disadvantages and other disadvantages not described above. The present invention is not necessarily required to overcome any of the disadvantages described above, and the exemplary embodiments of the present invention may not overcome any of the problems described above. The appended claims should be consulted to ascertain the true scope of the invention.

The present invention provides a web browsing method and system capable of selecting a hyperlink using identification information allocated based on the table structure of a web page, and a recording medium thereof.

The present invention also provides a web browsing method and system capable of selecting a hyperlink using identification information allocated based on the table structure of a web page and the number of hyperlinks, and a recording medium thereof.

The present invention also provides a web browsing method and system capable of selecting a hyperlink using information set according to the usage pattern of a user, and a recording medium thereof.

The present invention also provides a web browsing method and system capable of selecting a hyperlink using identification information allocated based on the table structure of a web page, the number of hyperlinks, and the usage pattern of a user, and a recording medium thereof.

According to an aspect of the present invention, there is provided a web browsing method including: dividing a web page to be displayed in a web client into a plurality of regions, based on the table structure of the web page; displaying in the web client the web page, including identification information allocated to each of the plurality of regions; if one region is selected among the plurality of regions, based on the identification information, displaying in the web client a web page formed with hyperlinks included in the selected region; and if hyperlink selection information is input based on the web page formed with the hyperlinks, the web client moving from the web page formed with the hyperlinks, to data connected to a hyperlink corresponding to the selection information.

According to another aspect of the present invention, there is provided a web browsing method including: dividing a web page to be displayed in a web client into a plurality of regions, based on the table structure of the web page; redefining the plurality of regions based on the number of hyperlinks included in each of the plurality of regions; displaying in the web client the web page including identification information allocated to each of the plurality of redefined regions; if one region among the plurality of redefined regions is selected based on the identification information, displaying in the web client a web page formed with hyperlinks included in the selected region; and if hyperlink selection information is input based on the web page formed with the hyperlinks, the web client moving from the web page formed with the hyperlinks to data connected to a hyperlink corresponding to the selection information.

According to still another aspect of the present invention, there is provided a web browsing method including: determining at least one specific hyperlink among hyperlinks included in a web page to be displayed in a web client; displaying in the web client the web page including identification information allocated to the at least one specific hyperlink; and if one specific hyperlink is selected based on the identification information of the specific hyperlink, the web client moving from the displayed web page to data connected to the selected specific hyperlink, wherein the specific hyperlink is determined based on information set in advance according to the usage pattern of hyperlinks of a user, and when the moving operation is performed, the information set in advance according to the usage pattern of the user is updated.

According to yet still another aspect of the present invention, there is provided a web browsing method including:

dividing a web page to be displayed in a web client into a plurality of regions, based on the table structure of the web page; determining a specific hyperlink among hyperlinks included in the web page; displaying in the web client the web page including identification information allocated to each of the plurality of regions and the specific hyperlink; and if one hyperlink is selected, based on the web page formed with the hyperlinks or based on the selected specific hyperlink as determined by the identification information of the specific hyperlink, moving from the displayed web page to data connected to the selected hyperlink, wherein the specific hyperlink is determined based on information set in advance according to the usage pattern of hyperlinks of a user.

According to a further aspect of the present invention, there is provided a web browsing method including: defining identification information tags for a plurality of regions to be divided, based on the table structure of a web page to be transmitted from a web server to a web client or based on the table structure and the number of hyperlinks; and transmitting the web page including the defined identification information tags to the web client.

According to an additional aspect of the present invention, there is provided a web browsing system having a web server and a web client capable of accessing the web server, wherein the web client includes: a web browser outputting a web page in which identification information is allocated to a plurality of regions divided based on the table structure of a web page received from the web server, or the table structure of the web page and the number of hyperlinks, and if arbitrary identification information is input, outputting a web page formed with hyperlinks included in a region corresponding to the input identification information, and if one hyperlink is selected based on the web page formed with the hyperlinks, moving from the web page formed with the hyperlinks to data connected to the selected hyperlink; an information input unit inputting information to select the identification information and the hyperlink; and a display unit displaying the web page.

According to an additional aspect of the present invention, there is provided a web browsing system having a web server and a web client capable of accessing the web server, wherein the web client includes: a processor defining identification information tags for a plurality of regions to be divided based on the table structure of a web page to be transmitted to the web client or based on the table structure and the number of hyperlinks; and a transmission and reception unit transmitting the web page including the defined identification information tags to the web client.

According to an additional aspect of the present invention, there is provided a web browsing system including: a web server defining identification information tags for a plurality of regions to be divided based on the table structure of a web page to be transmitted or based on the table structure and the number of hyperlinks, and transmitting the web page including the identification information tags defined for respective hyperlinks included in the regions to be divided; and a web client displaying a web page, including identification information allocated to the plurality of regions and identification information allocated to the hyperlinks, by analyzing the identification information tags included in the web page received from the web server, and performing web browsing according to the identification information.

According to an additional aspect of the present invention, there is provided a web browsing system including: a web server transmitting a web page; and a web client displaying the web page, including identification information allocated to regions to be divided based on the table structure of the web page received from the web server, or based on the table structure and the number of hyperlinks, and if one region is selected based on the identification information, displaying a web page, including identification information allocated to each of the hyperlinks included in the selected region, and if one identification information item allocated to the hyperlinks is input, moving from the displayed web page to data connected to the hyperlink corresponding to the input identification information.

According to an additional aspect of the present invention, there is provided a computer readable recording medium having embodied thereon a computer program for executing a web browsing method, wherein the web browsing method includes: dividing a web page to be displayed in a web client into a plurality of regions based on the table structure of the web page; displaying in the web client the web page including identification information allocated to each of the plurality of regions; if one region is selected among the plurality of regions, based on the identification information, displaying in the web client a web page formed with hyperlinks included in the selected region; and if hyperlink selection information is input based on the web page formed with the hyperlinks, the web client moving from the web page formed with the hyperlinks to data connected to a hyperlink corresponding to the selection information, and the web page formed with the hyperlinks includes identification information on each hyperlink and the hyperlink selection information is based on the identification information of the hyperlink.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF THE EXEMPLARY EMBODIMENTS

Certain exemplary embodiments of the present invention will now be described more fully with reference to the accompanying drawings.

Figure 1:
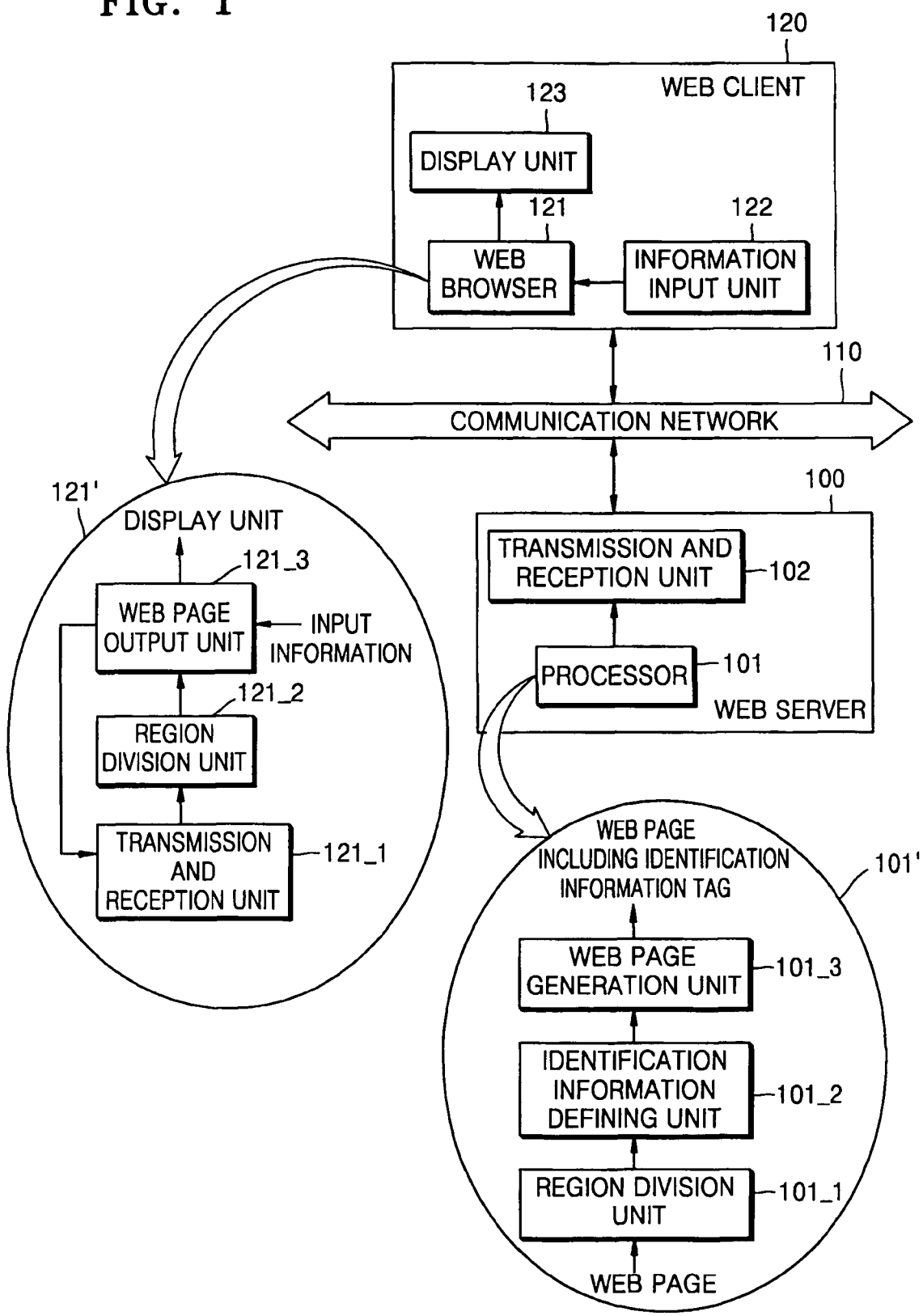
FIG. 1 is a functional block diagram of a web browsing system according to an exemplary embodiment of the present invention.

FIG. 1 shows an example in which identification information is selectively allocated and displayed in a web page, based on the table structure of the web page and the number of hyperlinks, and based on the displayed identification information, a hyperlink is selected.

Referring to FIG. 1, an exemplary embodiment of the web browsing system includes a web server 100, a communication network 110, and a web client 120.

The web server 100 provides a web page requested by the web client 120. The web page may be a hypertext markup language (HTML) document. The web server 100 may provide a web page according to the conventional methods or provide a web page with identification information tags defined according to an exemplary embodiment of the present invention. For this, the web server 100 includes a processor 101 and a transmission and reception unit 102.

If the web server 100 provides a web page according to the conventional methods, the processor 101 transmits a corresponding web page to the communication network 110 through the transmission and reception unit 102. Accordingly, the web client 120 receives the requested web page.

However, if the web server 100 provides a web page including identification information tags defined according to an exemplary embodiment of the present invention, the processor can define identification information tags in relation to a plurality of regions of the web page to be divided based on the table structure of the web page to be transmitted to the web client 120 or based on the number of hyperlinks and the table structure of the web page, and define an identification information tag in relation to a hyperlink included in each of the plurality of regions. Definition of an identification information tag complies with a tag definition rule of the conventional hypertext transfer protocol (HTTP).

Identification information for the plurality of regions and identification information for the hyperlink may be numeric information defined differently from each other. For example, identification information allocated to the plurality of regions may be numeric information defined in the form of "1, 2, 3, . . . " and identification information allocated to hyperlinks may be numeric information defined in the form of "①, ②, ③, . . . ." An identification information tag is defined so that identification is expressed in the form of numeric information as above.

In order to provide web page defined identification information tags, the processor 101 may include a region division unit 101_1, an identification information defining unit 101_2, and a web page generation unit 101_3, as shown in FIG. 1 (reference number 101').

The region division unit 101_1 can be implemented to divide regions of a web page to be transmitted based on the table structure of the web page or based on the table structure and the number of hyperlinks.

In the case where the regions of the web page are divided based on the table structure of the web page, when the web page to be transmitted is input, the region division unit 101_1 identifies the table structure of the web page by analyzing tag information of the web page, and based on the identified table structure, divides the web page into a plurality of regions.

However, in the case where the regions of the web page are divided based on the table structure of the web page and the number of hyperlinks, if the web page to be transmitted is input, the region division unit 101_1 identifies the table structure of the web page by analyzing tag information of the web page, divides the web page into a plurality of regions based on the identified table structure, and then checks the number of hyperlinks included in each of the plurality of regions. If the number of hyperlinks included in an arbitrary region is equal to or less than a predetermined number, the region division unit 101_1 can group the region together with at least one adjacent region. The adjacent region used for grouping can be determined in order of the increasing number of hyperlinks among regions adjacent to the arbitrary region. Accordingly, as an example, the predetermined number and an adjacent region that is the object of the grouping can be determined so that the number of hyperlinks included in the grouped region is equal to or less than 9.

The identification information defining unit 101_2 can be implemented to define only identification information tags for the plurality of regions divided in the region division unit 101_1 or to define identification information tags for the plurality of regions divided in the region division unit 101_1 and identification information tags for hyperlinks included in the plurality of regions, respectively.

In the case where the identification information defining unit 101_2 defines only identification information tags of the plurality of regions divided in the region division unit 101_1, the identification information defining unit 101_2 defines identification information tags so that numeric information such as "1, 2, 3, . . . " is allocated in the plurality of divided regions as described above.

However, in the case where the identification information defining unit 101_2 defines identification information tags for the plurality of regions and identification information tags for hyperlinks allocated to the plurality of regions, respectively, the identification information defining unit 101_2 defines identification information tags so that numeric information such as "1, 2, 3, . . . " is allocated in the plurality of divided regions as described above, and then, defines the identification information tags in relation to the hyperlinks so that numeric information such as "①, ②, ③, . . . " is allocated to the hyperlinks as described above.

The web page generation unit 101_3 generates a web page including the identification information tags defined in the identification information defining unit 101_2. The generated web page is transmitted to the transmission and reception unit 102.

If a web page is requested by the web client 120 through the communication network 110, the transmission and reception unit 102 transmits a web page request signal to the processor 101 and transmits a web page transmitted by the processor 101 to the web client 120 through the communication network 110.

The communication network 110 transmits and receives web pages corresponding to HTML documents, based on the HTTP protocol and link information (for example, a uniform resource locator (URL)), between the web server 100 and the web client 120.

If a web page in which identification information tags are not defined is received from the web server 100, the web client 120 allocates identification information based on the table structure of the web page and the number of hyperlinks, and performs web browsing by displaying the web page including the allocated identification information.

However, if a web page in which identification information tags are defined is received from the web server 100, the web client 120 analyzes identification information tags included in the received web page, displays the web page including identification information allocated to the plurality of regions and identification information allocated to the hyperlinks, and performs web browsing according to the identification information.

For this, the web client 120 includes a web browser 121, an information input unit 122, and a display unit 123.

If a web page in which identification information tags are not defined is received from the web server 100, the web browser 121 allocates identification information to each of the plurality of regions divided based on the table structure of the web page received from the web server 100, or based on the table structure and the number of hyperlinks, and outputs the web page in which identification information is allocated to the display unit 123.

The identification information is allocated so that numeric information of the form described above with reference to the web server 100 is overlaid on corresponding regions. Accordingly, a web page in which numbers "1, 2, 3, 4, 5, 6, 7, and 8" are allocated to respective divided regions as shown in FIG. 2 is displayed on the display unit 123.

Figure 2:
FIG. 2 illustrates an example of a web page displayed in a display unit of a web client shown in FIG. 1 according to an exemplary embodiment of the present invention.

FIG. 2 illustrates an example of a web page displayed on the display unit 123 of the web client 120 shown in FIG. 1 in which identification information is allocated to each of the divided regions.

When a web page is divided into a plurality of regions based on the table structure, the web browser divides regions based on the result of analyzing the tag information of the received web page. However, when a web page is divided into a plurality of regions based on the table structure and the number of hyperlinks, the web browser checks whether there is a region, among the plurality of divided regions, in which the number of hyperlinks in the region is equal to or less than a predetermined value. If there is a region in which the number of hyperlinks is equal to or less than the predetermined value, the web browser 121 redefines the divided region so that the region is grouped together with at least one region among regions adjacent to the region, in order of the increasing number of hyperlinks included in each region. The predetermined value and the adjacent region are identical to those described above with reference to the web server 100, respectively.

If a user inputs an identification information item through the information input unit 122 based on the web page displayed as shown in FIG. 2, the web browser 121 outputs to the display unit 123 a web page formed with hyperlinks included in the region corresponding to the input identification information. If one hyperlink is selected based on the output web page formed with the hyperlinks, the web browser moves from the web page formed with the hyperlinks to data connected to the selected hyperlink. The data connected to the hyperlink may be a web page, a web site, a picture, a sound, a video, a document, a downloadable file, and so forth.

When the web page formed with hyperlinks is displayed, identification information for each hyperlink may not be allocated in the web page formed with the hyperlinks. In this case, by using a direction key located on the information input unit 122, a desired hyperlink can be selected in the displayed web page formed with the hyperlinks.

Figure 3:
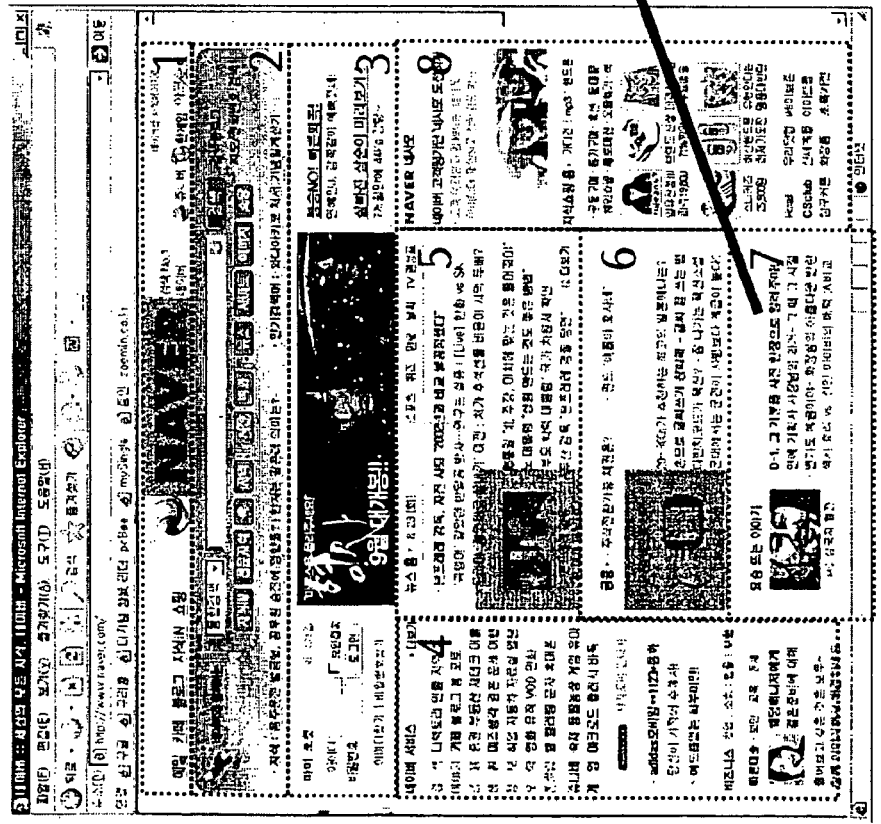
FIG. 3 illustrates another example of a web page displayed in a display unit of a web client shown in FIG. 1 according to an exemplary embodiment of the present invention.

However, in order to display a web page in which identification information on each hyperlink is allocated as shown in FIG. 3, the web browser 121 can allocate identification information in each hyperlink included in a selected region and output the web page formed with hyperlinks including allocated identification information.

FIG. 3 illustrates another example of a web page displayed on the display unit 123 of the web client 120 shown in FIG. 1 in which region 7 is selected among divided regions on the main web page and a web page formed with hyperlinks included in the selected region 7 is displayed on the display unit 123.

FIG. 3 shows a case in which numeric information such as "①,②,③, . . ." is allocated as identification information for each hyperlink. When the web page formed with hyperlinks is as shown in FIG. 3, if "②" is input as hyperlink selection information through the information input unit 102, the web browser 121 moves to data connected to a hyperlink "Oh, whirl!—a bridge breaking a stereotyped idea." That is, the web browser 121 moves to a web site or web page corresponding to the hyperlink, by using the URL of the hyperlink "Oh, whirl!—a bridge breaking a stereotyped idea."

At this time, in order to distinguish identification information items allocated to divided regions and hyperlinks, numeric information items defined in different forms are displayed in the web page displayed on the display unit 123, but the information input unit 122 can be implemented so that identical numeric keys can be used to input selection information for both regions and hyperlinks.

That is, when the web page shown in FIG. 2 is displayed on the display unit 123, if numeric key information is input form the information input unit 122, the web browser 121 can recognize it as information to select a divided region. If a divided region is selected and the web page formed with hyperlinks is displayed on the display unit 123, and then numeric key information is input from the information input unit 122, the web browser 121 can recognize it as information to select a hyperlink.

Figure 4:
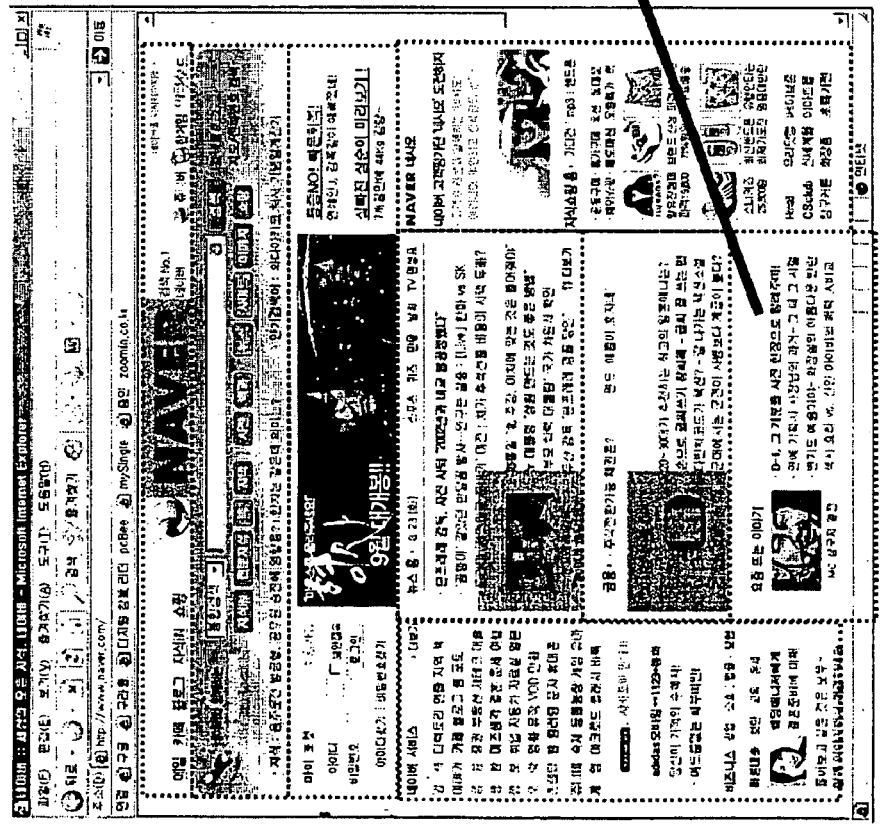
FIG. 4 illustrates still another example of a web page displayed in a display unit of a web client shown in FIG. 1 according to an exemplary embodiment of the present invention.

Meanwhile, when a region among the plurality of regions shown in FIG. 2 is selected and a web page formed with hyperlinks is output, the web browser 121 can delete identification information allocated to the plurality of regions as shown in FIG. 4. FIG. 4 illustrates another example of a web page displayed in the display unit 123 of the web client 120 shown in FIG. 1 and shows a case in which when a region among a plurality of regions is selected and a web page formed with hyperlinks is output, identification information allocated to the plurality of regions is deleted.

In order to perform web browsing as described above (when a web page from the web server 100 in which identification information tags are not defined is received), the web browser 121 can include a transmission and reception unit 121_1, a region division unit 121_2, and a web page output unit 121_3 as shown in FIG. 1 (reference number 121').

The transmission and reception unit 121_1 receives a web page from the communication network 110, provides the received web page to the region division unit 121_2, and if information on a selected hyperlink (for example, URL information) from the web page output unit 121_3 is input, performs processing to move to data linked to the information corresponding to the input hyperlink.

If the web page is received, the region division unit 121_2 divides the web page into a plurality of regions based on the table structure of the web page or based on the table structure and the number of hyperlinks, as described above.

The web page output unit 121_3 allocates identification information to each of the regions divided in the region division unit 121_2, outputs the web page in which identification information is allocated, and if one of the plurality of regions is selected based on the identification information displayed on the output web page, outputs a web page formed with hyperlinks included in the selected region. At this time, in order to display identification information allocated to each hyperlink in the web page which is formed with the hyperlinks and is to be output, the web page output unit 121_3 can allocate identification information to each hyperlink and output the web page formed with hyperlinks having allocated identification information.

The information input unit 122 inputs identification information displayed on the display unit 123 and information to select a hyperlink.

The display unit 123 displays a web page output from the web browser 121.

The web client 120 may be an electronic appliance including an information input unit including a plurality of buttons and a display unit, such as a digital TV or a mobile phone.

Figure 5:
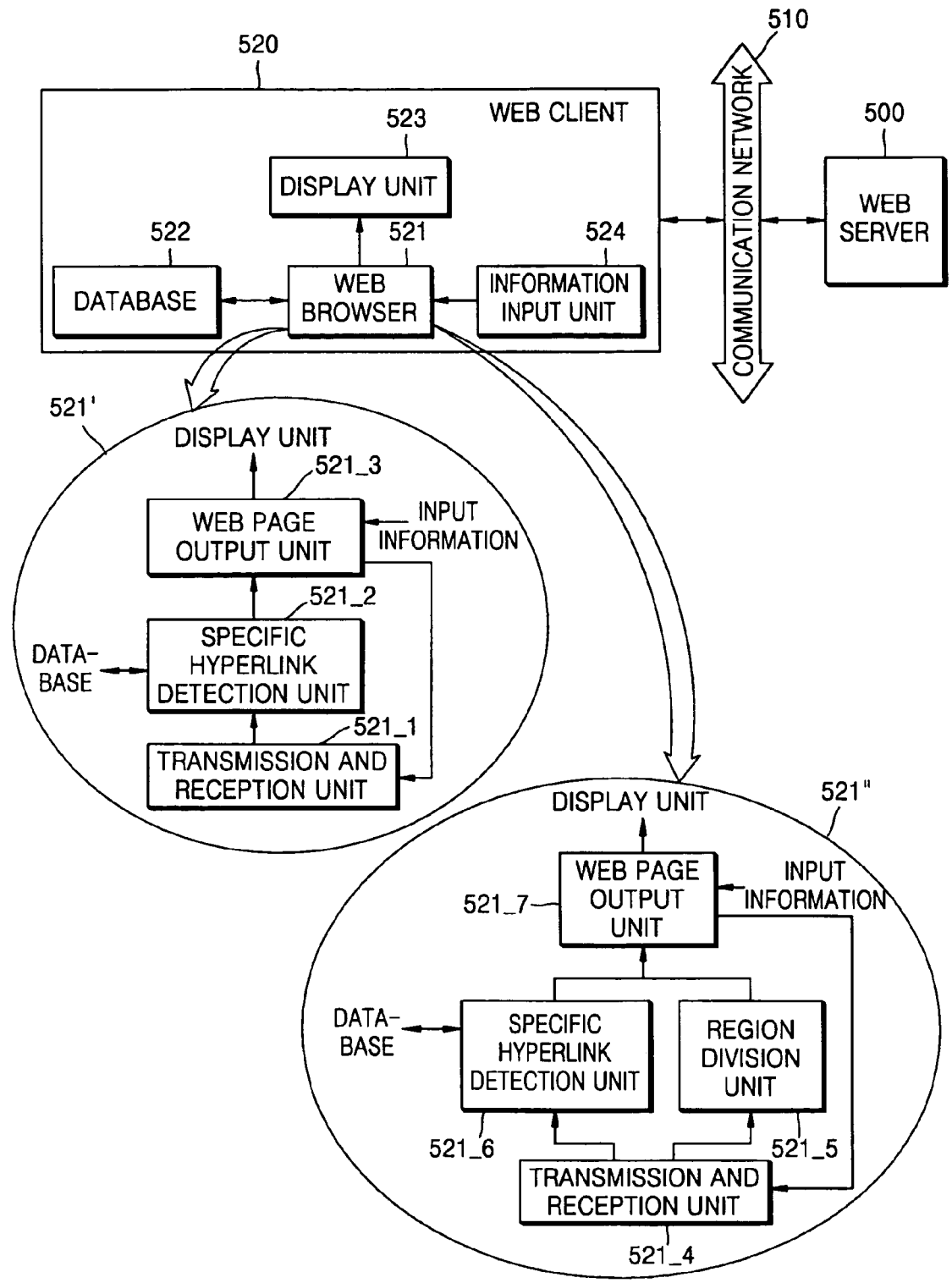
FIG. 5 is a functional block diagram of a web browsing system according to another exemplary embodiment of the present invention.

FIG. 5 is a functional block diagram of a web browsing system according to another exemplary embodiment of the present invention. FIG. 5 shows a case in which identification information is selectively allocated to a web page and displayed by using information set in advance according to the usage pattern of a user, or identification information is selectively allocated to a web page and displayed by using information set in advance according to the table structure of a web page, the number of hyperlinks, and the usage pattern of the user, and then a hyperlink is selected using the displayed identification information.

A web server 500 and a communication network 510 are identical to the web server 100 and the communication network 110, respectively, shown in FIG. 1.

If identification information tags are defined in a web page received from the web server 500, the web client 520 displays on a display unit 523 the web page which includes identification information tags for regions divided by the table structure of the web page and identification information for hyperlinks of each of the divided regions. However, if identification information tags are not defined in the web page received from the web server 500, the web client 520 allocates sequential identification information tags to regions divided by the table structure of the web page and hyperlinks within each of the divided regions, and then displays on the display unit 523 the web page in which identification information is allocated.

At this time, regardless of whether identification information tags are defined in the web page received from the web server 500, the web client 520 selectively allocates and displays identification information for hyperlinks in the web page using information set in advance according to the usage pattern of the user. For this, the web client 520 detects specific hyperlinks among hyperlinks included in the received web page, based on the information according to the usage pattern of the user, which is set in advance. The information according to the usage pattern of the user is bookmark information and/or hyperlink information set in advance by the user and/or hyperlink information set based on information on links the user accessed recently. Accordingly, the specific hyperlink in the received web page may match with information set according to the usage pattern of the user.

Figure 6:
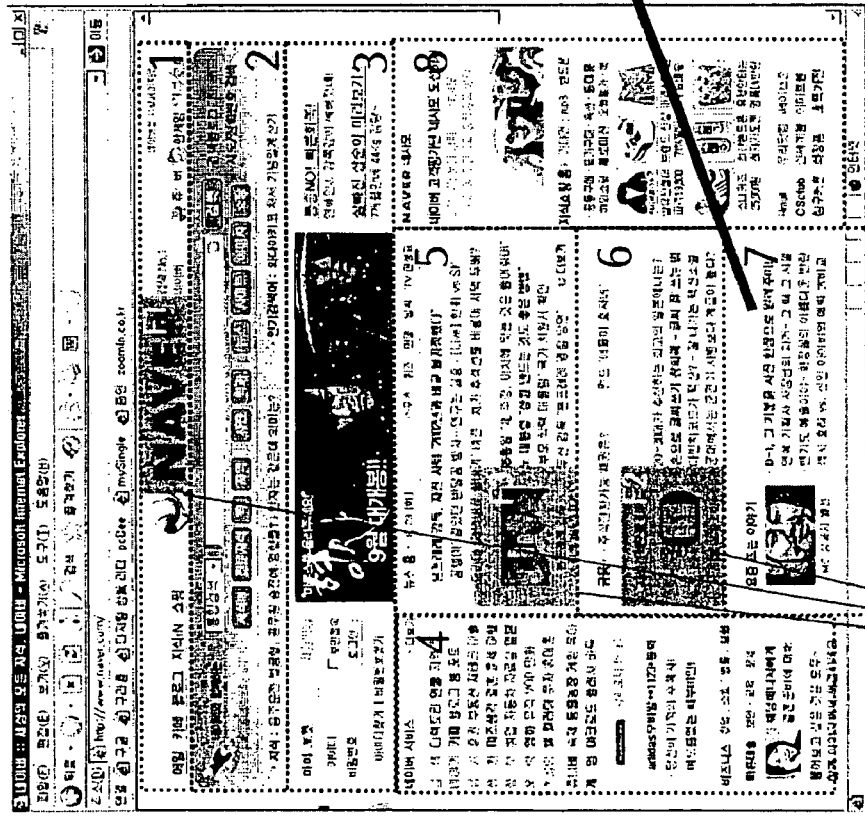
FIG. 6 illustrates an example of a web page displayed in a display unit of a web client shown in FIG. 5 according to an exemplary embodiment of the present invention.
Figure 7:
FIG. 7 illustrates another example of a web page displayed in a display unit of a web client shown in FIG. 5 according to an exemplary embodiment of the present invention.

If a specific hyperlink is detected, the web client 520 allocates identification for the detected hyperlink and displays a web page including the allocated identification information. That is, the web client 520 can display a web page in which only identification information for the specific hyperlinks is displayed as shown in FIG. 6, or can display a web page in which identification information for the specific hyperlinks is allocated and identification information for each of the regions divided based on the table structure of the web page and hyperlinks of a selected region is allocated as shown in FIG. 7. Referring to FIGS. 6 and 7, identification information for specific hyperlinks is function key information, such as "F1, F2, F3." However, for identification information for specific hyperlinks, any one of numeric information and predetermined function key information can be used.

In order to perform the operations described above, the web client 520 comprises a web browser 521, a database 522, a display unit 523, and an information input unit 524.

The database 522 stores information about the user's usage pattern of hyperlinks. The information stored in the database 522 may be updated whenever the user moves to data connected to a hyperlink.

The web browser 521 detects a specific hyperlink among hyperlinks included in the web page by referring to the database 522 and outputs a web page further including identification information for the detected specific hyperlink.

When the web page further including the identification information for the specific hyperlink among hyperlinks included in the web page is output, the web browser 521 may include a transmission and reception unit 521_1, a specific hyperlink detection unit 521_2, and a web page output unit 521_3, as shown in FIG. 5 (reference number 521').

The transmission and reception unit 521_1 is the same as the transmission and reception unit 121_1 of FIG. 1.

The specific hyperlink detection unit 521_2 detects a specific hyperlink in an input web page by referring to the database 522. That is, the specific hyperlink detection unit 521_2 detects as a specific hyperlink a hyperlink matching information stored in the database 522, among the hyperlinks included in the web page. The web page output unit 521_3 allocates identification information to the specific hyperlink and can output a web page including identification information allocated to the specific hyperlink, as shown in FIG. 6.

Also, when a web page in which identification information for the specific hyperlinks is allocated and identification information for each of regions divided in a table structure of the web page and hyperlinks of a selected region is allocated is output, the web browser 521 can include a transmission and reception unit 521_4, a region division unit 521_5, a specific hyperlink detection unit 521_6, and a web page output unit 521_7, as shown in FIG. 5 (reference number 521").

The transmission and reception unit 521_4 is analogous to the transmission and reception unit 521_1.

The region division unit 521_5 is analogous to the region division unit 121_1 of FIG. 1, and the specific hyperlink detection unit 521_6 is analogous to the specific hyperlink detection unit 521_2. The web page output unit 521_7 outputs to the display unit 523 a web page in which identification information is allocated to each of the regions divided in the region division unit 521_5, hyperlinks of a selection region, and a specific hyperlink detected in the specific hyperlink detection unit 521_6, so that the web page as shown in FIG. 7 is displayed.

Figure 8:
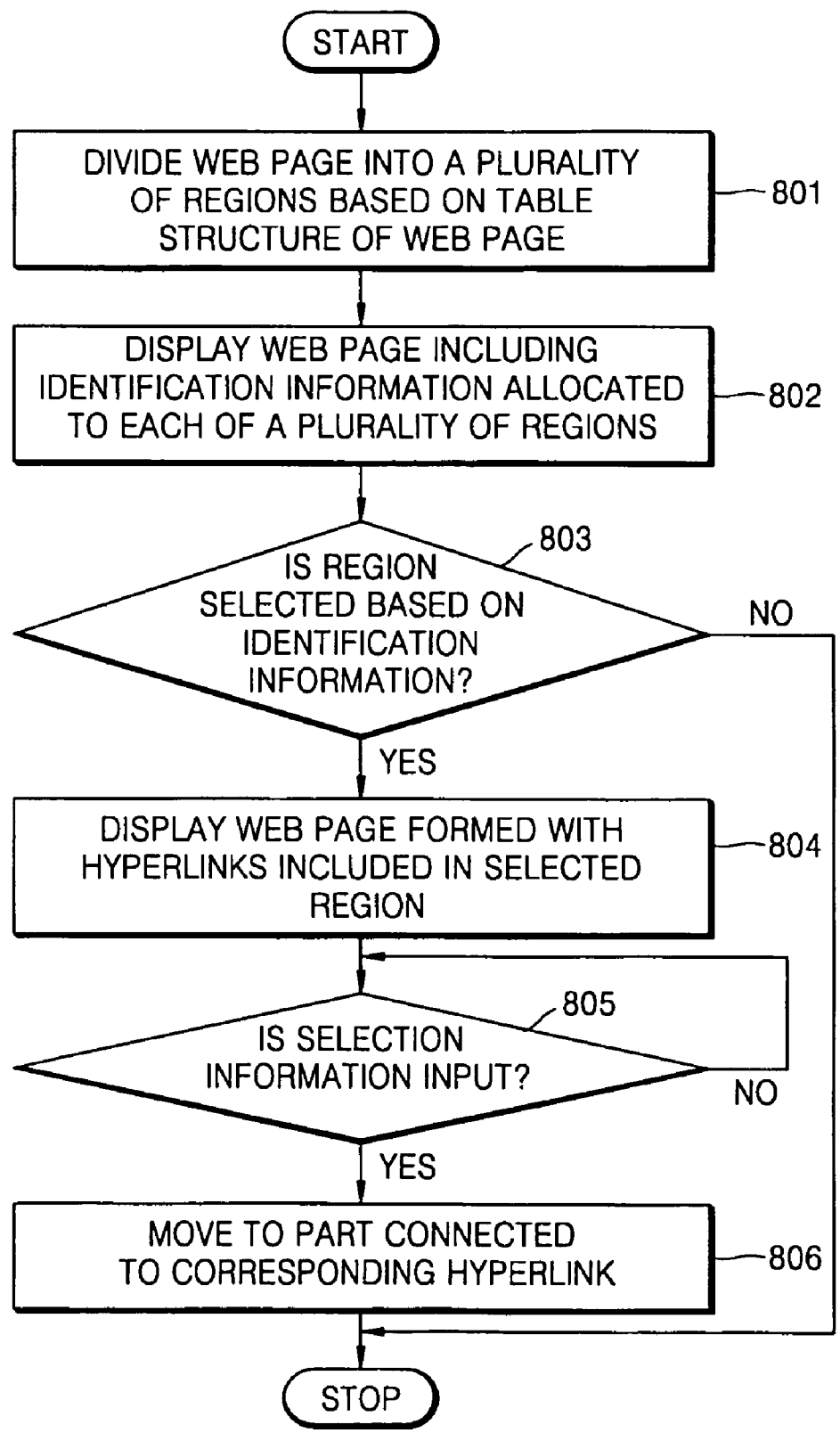
FIG. 8 is a flowchart of the operations of a web client in a web browsing method according to another exemplary embodiment of the present invention.

FIG. 8 is a flowchart of the operations of a web client in a web browsing method according to another exemplary embodiment of the present invention. Referring to FIGS. 1 and 8, a web page is divided into a plurality of regions based on the table structure of a web page to be displayed on the display unit 123 of the web client 120 in operation 801.

A web page including identification information allocated to each of the plurality of regions is displayed on the display unit 123 of the web client 120 in operation 802. Accordingly, the web page shown in FIG. 2 can be displayed on the display unit 123. The identification information can be allocated by the web client 120 or the web server 100. That is, if the web server 100 provides a web page including identification information tags defining identification information, the web client 120 can display a web page including identification information based on the result of analyzing the identification information tags. However, if the web server 100 provides a web page not including the identification information tags, the web client 120 can allocate identification information to the regions in order of time that a region is divided and display the web page including the allocated identification information.

If a region among the plurality of regions is selected based on the displayed identification information, the web client 120 displays a web page formed with hyperlinks included in the selected region on the display unit 123 of the web client 120 in operations 803 and 804. Accordingly, the web page as shown in FIG. 3 can be displayed on the display unit 123.

The web page formed with the hyperlinks includes identification information allocated to each hyperlink included in the selected region and hyperlink information, and hyperlink selection information is one of identification information allocated to each hyperlink. The identification information allocated to each of the plurality of regions and the identification information allocated to each of the hyperlinks can be numeric information as shown in FIGS. 2 and 3.

If hyperlink selection information is input based on the web page formed with the hyperlinks, the web client 120 moves from the web page formed with the hyperlinks to data connected to the hyperlink corresponding to the selection information in operations 805 and 806.

Meanwhile, if a region is not selected based on identification information in operation 803, the web client 120 may terminate the job according to an exemplary embodiment of the present invention. Also, the web client 120 may maintain a wait state until selection information is input in operation 805.

Figure 9:
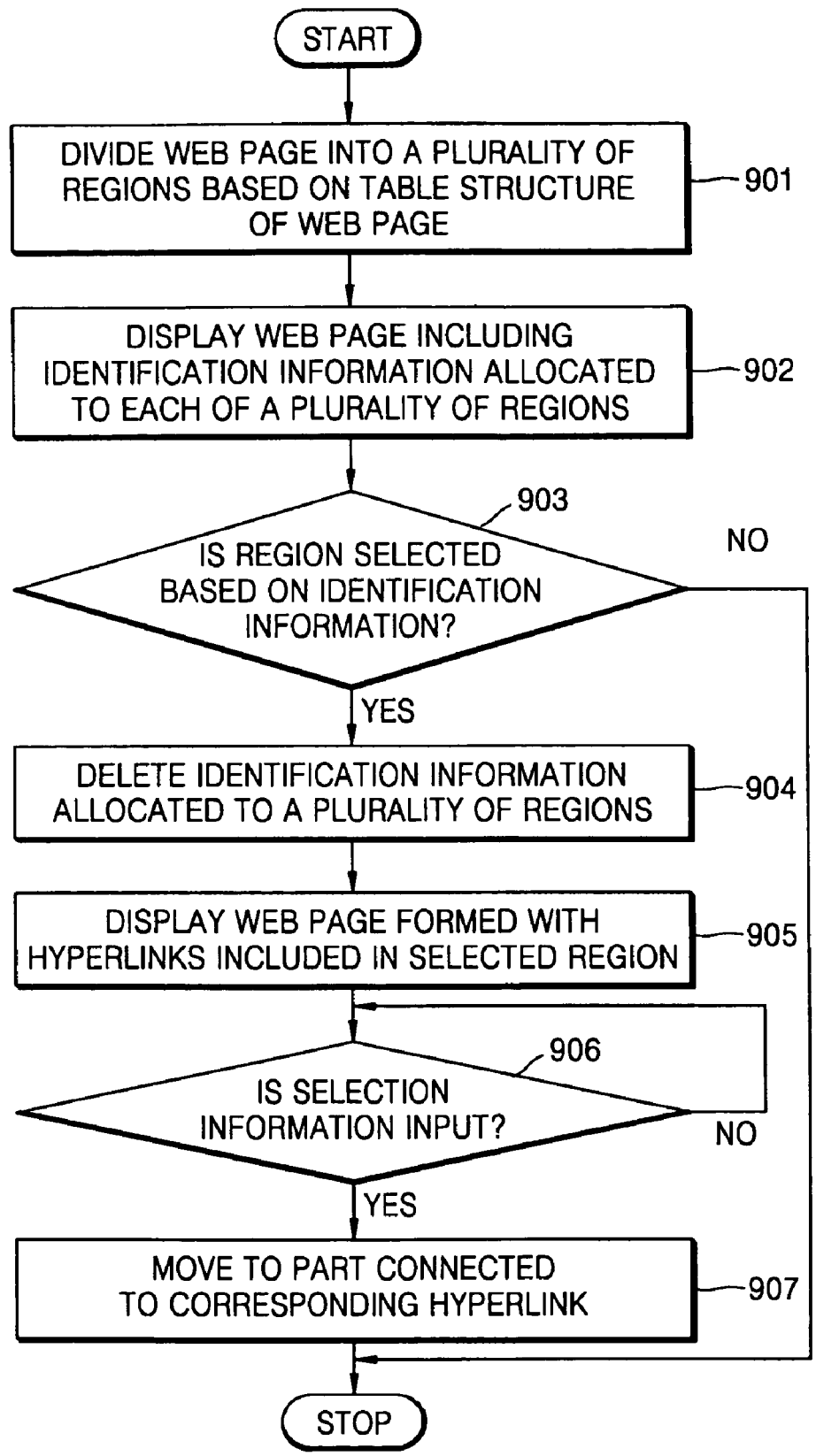
FIG. 9 is a flowchart of the operations of a web client in a web browsing method according to still another exemplary embodiment of the present invention.

FIG. 9 is a flowchart of the operations of a web client in a web browsing method according to still another exemplary embodiment of the present invention. FIG. 9 is different from FIG. 8 in that FIG. 9 further includes an operation in which if one of a plurality of regions is selected, the web client 120 deletes identification information allocated to each of the plurality of regions. Accordingly, operations 901 through 903, 905 through 907 of FIG. 9 are identical to operations 801 through 806, respectively, of FIG. 8. However, if one region is selected based on the identification information as described above, identification information allocated to each of the plurality of regions is deleted in operation 904, and then a web page formed with hyperlinks included in the selected region is displayed in operation 905.

Accordingly, the web page selected by "select region 7" shown in FIG. 4 can be displayed on the display unit 123 of the web client 120.

Figure 10:
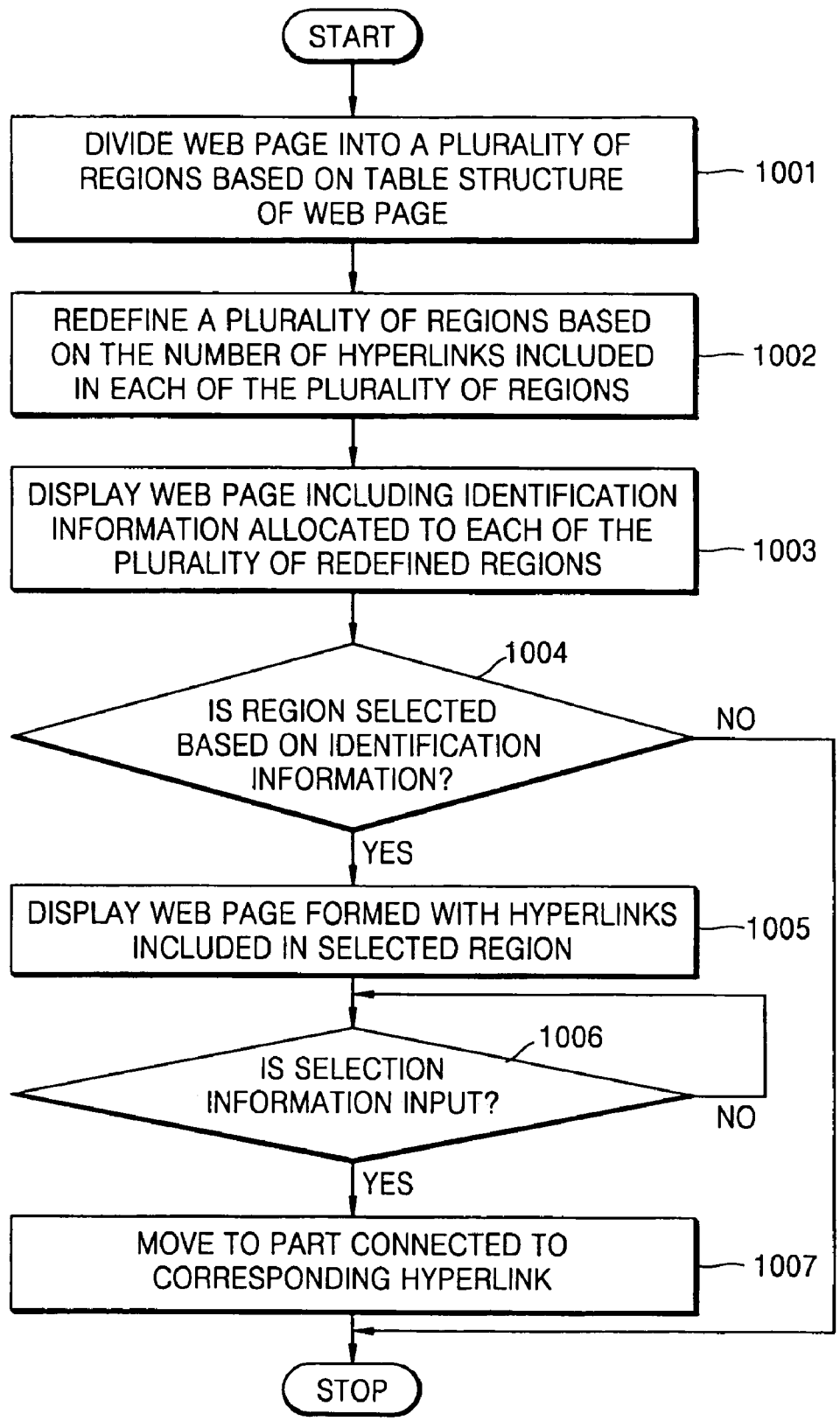
FIG. 10 is a flowchart of the operations of a web client in a web browsing method according to still another exemplary embodiment of the present invention.

FIG. 10 is a flowchart of the operations of a web client in a web browsing method according to still another exemplary embodiment of the present invention.

Referring to FIGS. 1 and 10, the web client 120 divides a web page into a plurality of regions based on the table structure of the web page to be displayed on the display unit 123 in operation 1001. That is, the web client 120 divides the web page into a plurality of regions based on the table structure of the web page obtained by analyzing the tag information of the received web page.

The web client 120 redefines the plurality of regions based on the number of hyperlinks included in each of the plurality of regions in operation 1002. The redefining of the plurality of regions is performed in the manner in which a region in which the number of hyperlinks is equal to or less than a predetermined value is grouped together with at least one region among adjacent regions in order of the increasing number of hyperlinks included in each region.

The web client 120 displays the web page including identification information allocated to each of the plurality of redefined regions on the display unit 123 of the web client 120 in operation 1003. If one region is selected among the plurality of redefined regions based on the identification information, the web page formed with hyperlinks included in the selected region is displayed on the display unit 123 of the web client 120 in operations 1004 and 1005.

If hyperlink selection information is input through the information input unit 122 based on the web page formed with the hyperlinks, the web client 120 moves from the web page formed with the hyperlinks to data connected to a hyperlink corresponding to the selection information in operations 1006 and 1007.

Figure 11:
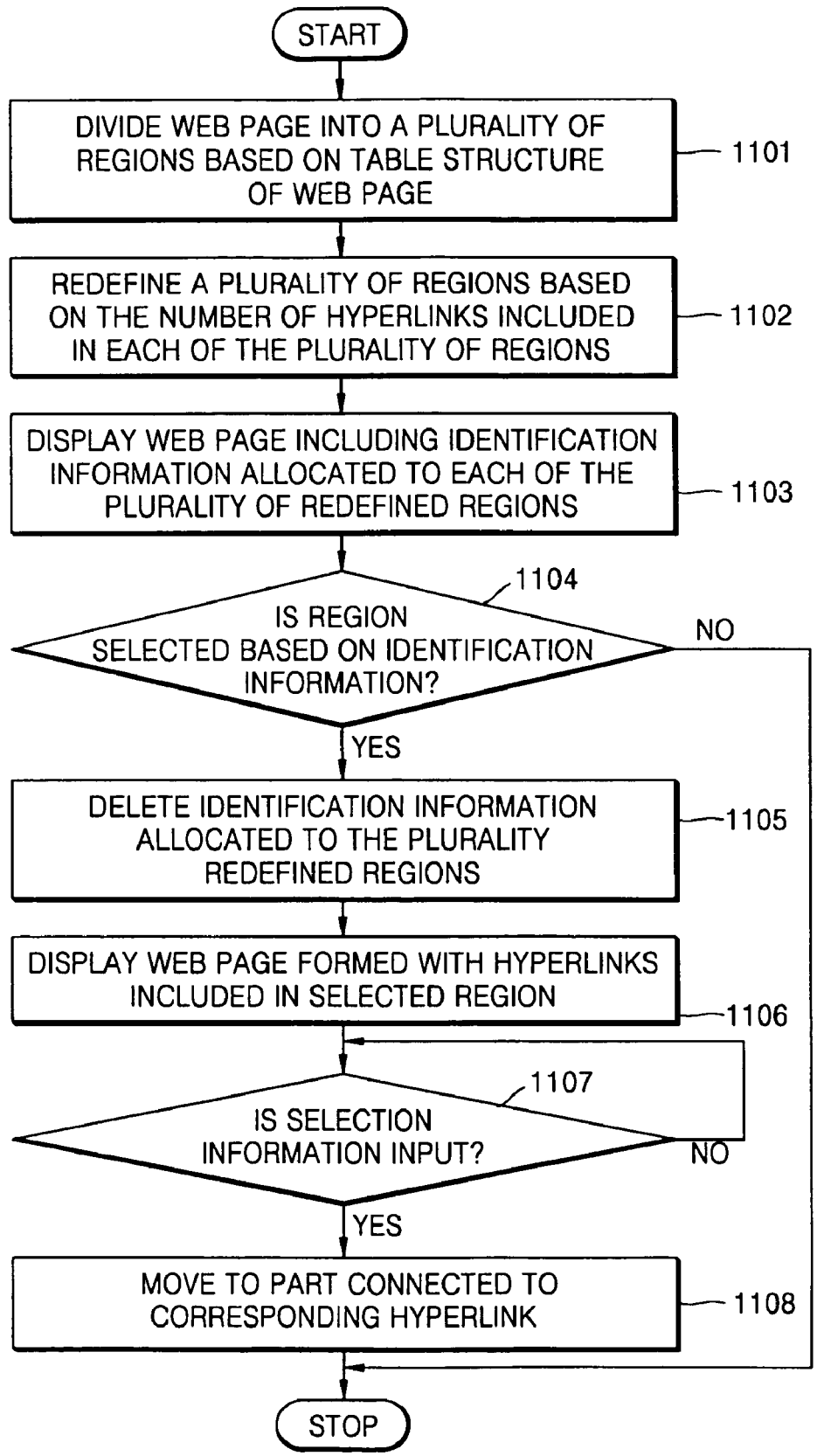
FIG. 11 is a flowchart of the operations of a web client in a web browsing method according to still another exemplary embodiment of the present invention.

FIG. 11 is a flowchart of the operations of a web client in a web browsing method according to still another exemplary embodiment of the present invention.

FIG. 11 is different from FIG. 10 in that FIG. 11 further includes an operation in which if one of a plurality of regions is selected, the web client 120 deletes identification information allocated to each of the plurality of regions. Accordingly, operations 1101 through 1104 and 1106 through 1108 of FIG. 11 are identical to operations 1001 through 1007, respectively, of FIG. 10. However, if one region is selected based on the identification information, identification information allocated to each of the plurality of redefined regions is deleted and the web page shown in FIG. 4 is displayed on the display unit 123 of the web client 120 in operation 1105.

The web page formed with the hyperlinks included in the selection region is displayed in operation 1106, similar to the operation 905 of FIG. 9.

Figure 12:
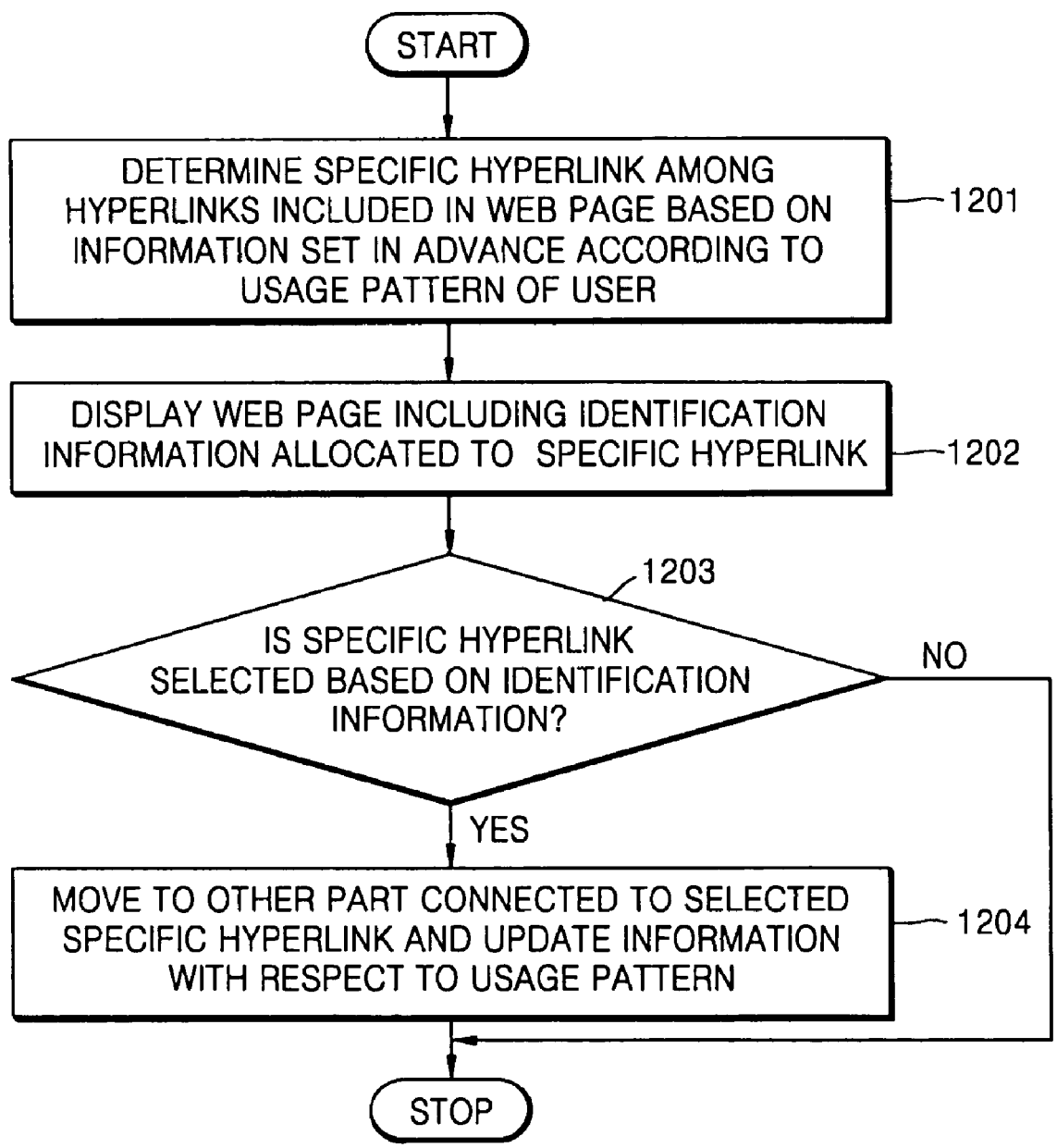
FIG. 12 is a flowchart of the operations of a web client in a web browsing method according to still another exemplary embodiment of the present invention.

FIG. 12 is a flowchart of the operations of a web client in a web browsing method according to still another exemplary embodiment of the present invention.

Referring to FIGS. 5 and 12, the web client 520 determines at least one specific hyperlink among the hyperlinks included in the web page to be displayed based on information set in advance according to the usage pattern of the user stored in the database 522. The information set in advance according to the usage pattern of the user is the same as defined in FIG. 5.

If the specific hyperlink is determined, the web page including the identification information allocated to the specific hyperlink is displayed in the web client 520 in operation 1202. The identification information allocated to the specific hyperlink is the same as defined in FIG. 5.

If the specific hyperlink is selected based on the identification information, the web client 520 moves from the displayed web page to data connected to the selected hyperlink and at the same time updates the information according to the usage pattern of the user in operations 1203 and 1204.

Figure 13:
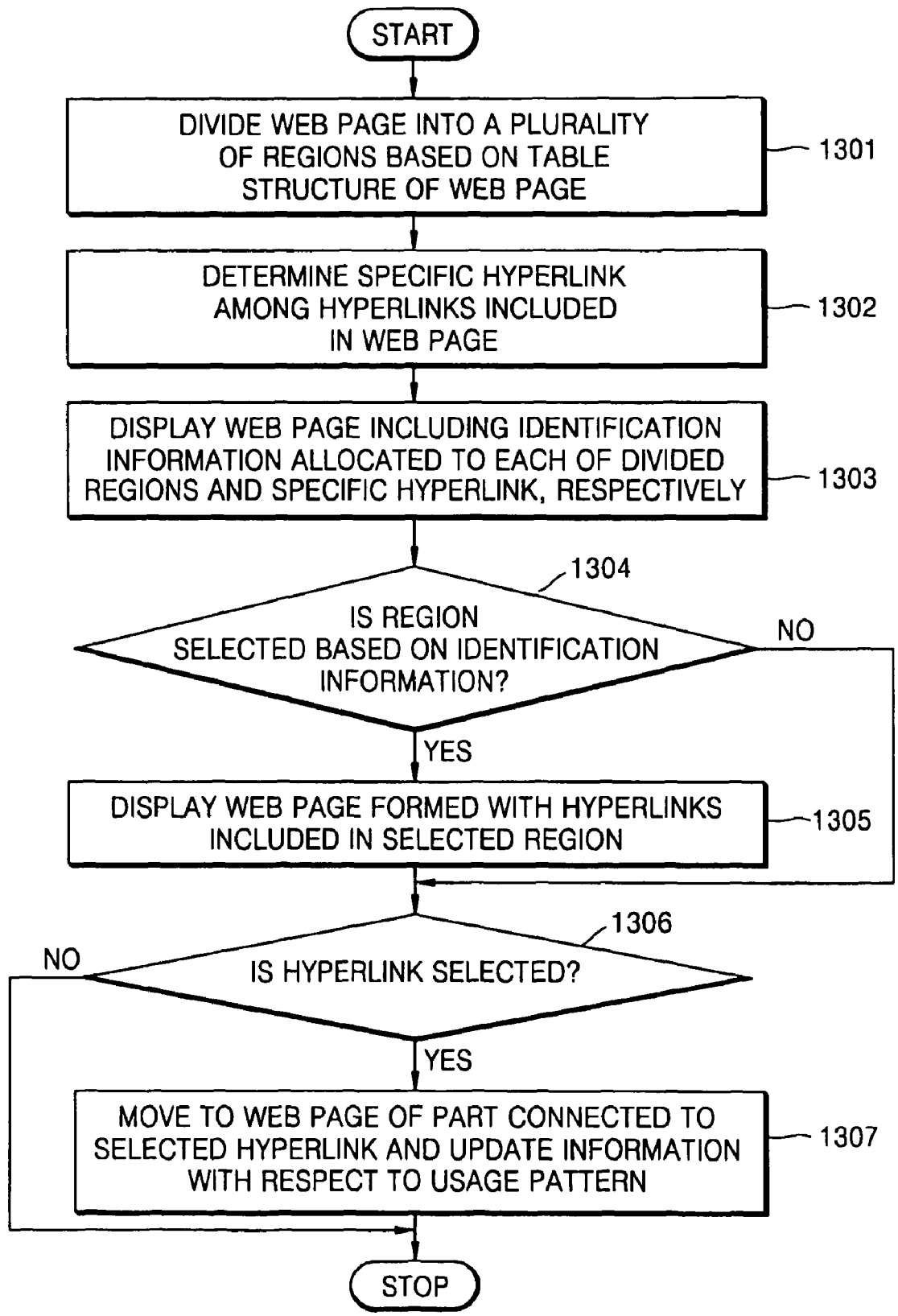
FIG. 13 is a flowchart of the operations of a web client in a web browsing method according to still another exemplary embodiment of the present invention.

FIG. 13 is a flowchart of the operations of a web client in a web browsing method according to still another exemplary embodiment of the present invention.

Referring to FIGS. 5 and 13, the web client 520 divides a web page into a plurality of regions based on the table structure of the web page to be displayed on the display unit 523 in operation 1301 as in operation 801 of FIG. 8.

The web client 520 determines a specific hyperlink among hyperlinks included in the web page in operation 1302. That is, the web client 520 determines the specific hyperlink, similar to operation 1201 of FIG. 12.

The web client 520 displays a web page, including identification information allocated to each of the plurality of regions and the specific hyperlink, on the display unit 523 of the web client 520 in operation 1303.

If one region is selected among the plurality of regions based on the identification information, a web page formed with the hyperlinks included in the selected region is displayed on the display unit 523 of the web client 520 in operation 1305. The web page formed with the hyperlinks can include identification information allocated to each hyperlink and hyperlink information as defined in FIG. 5.

If one hyperlink is selected based on the identification information displayed on the web page formed with the hyperlinks in operation 1305 or a specific hyperlink is selected based on the identification information for the specific hyperlink displayed in operation 1303, the web client 520 moves from the web page displayed on the display unit 523 to data linked to the selected hyperlink and at the same time updates the information according to the usage pattern of the user in operation 1307.

Figure 14:
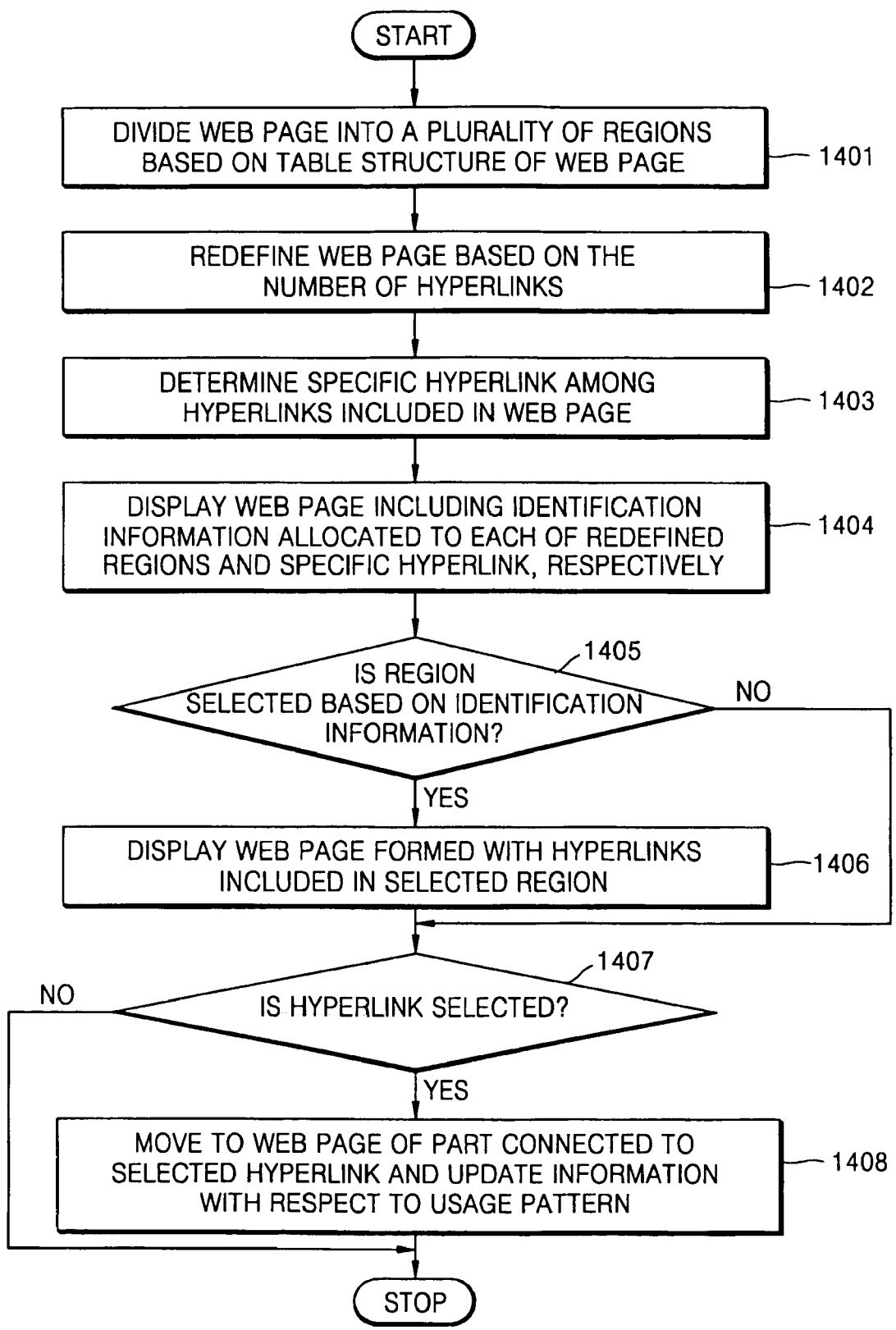
FIG. 14 is a flowchart of the operations of a web client in a web browsing method according to still another exemplary embodiment of the present invention.

FIG. 14 is a flowchart of the operations of a web client in a web browsing method according to still another exemplary embodiment of the present invention. In addition to the method shown in FIG. 13, FIG. 14 further includes an operation redefining a plurality of regions based on the number of hyperlinks included in the plurality of regions.

That is, the web client 520 divides a web page into a plurality of regions in operation 1401, and then, based on the number of hyperlinks included in divided regions, redefines the web page in operation 1402. The method of redefining the web page is as described above with reference to FIG. 5.

Accordingly, the web page displayed on the display unit 523 of the web client 520 in operation 1404 is a web page including identification information allocated to each of the plurality of redefined regions and a specific hyperlink. Operations 1405 through 1408 of FIG. 14 are identical to operations 1304 through 1307, respectively, of FIG. 13.

Figure 15:
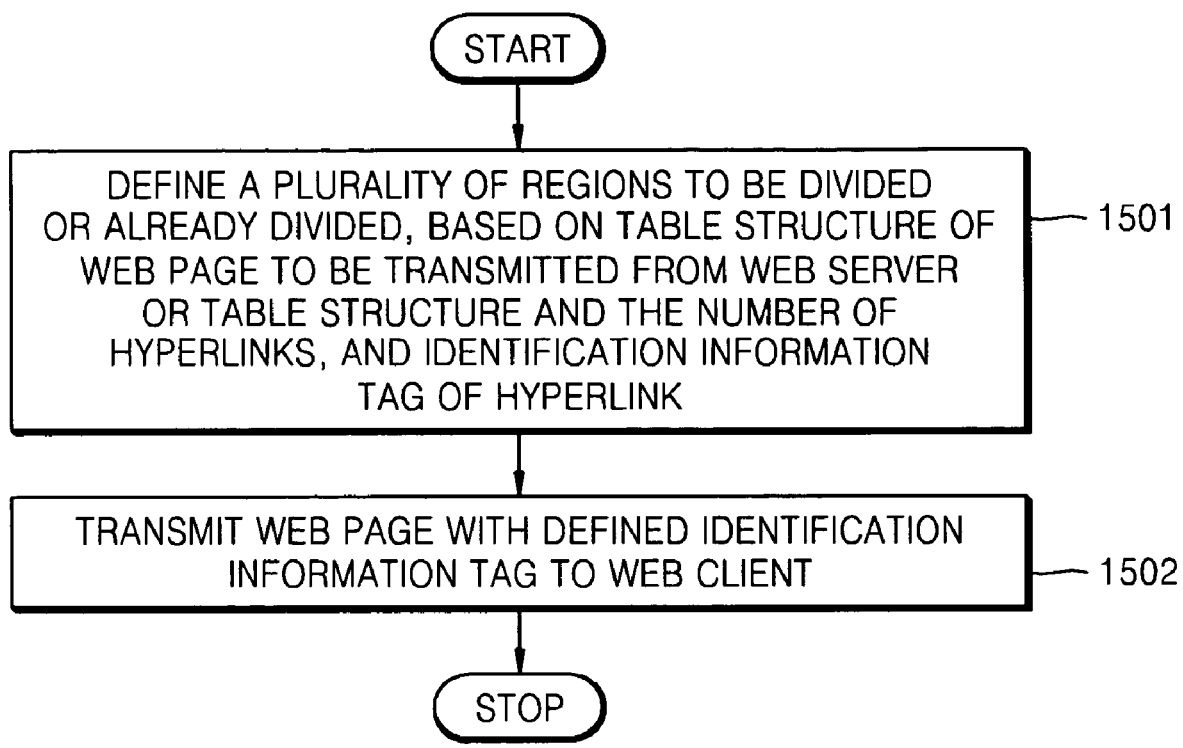
FIG. 15 is a flowchart of the operations of a web server in a web browsing method according to still another exemplary embodiment of the present invention.

FIG. 15 is a flowchart of the operations of a web server in a web browsing method according to still another exemplary embodiment of the present invention. The web server 100 of FIG. 1 or the web server 500 of FIG. 5 defines identification information tags in relation to a plurality of regions to be divided, or defines identification information tags in relation to the plurality of regions and hyperlinks included in each of the plurality of regions, based on the table structure of the web page to be transmitted to the web client 120 or 520, or based on the table structure of the web page and the number of hyperlinks, in operation 1501. The method of defining the identification information tags in the web server 100 is as described above with reference to FIG. 1.

The web server 100 or 500 transmits the web page, including defined identification information tags, to the web client 120 or 520 in operation 1502.

A program to perform a web browsing method according to an exemplary embodiment of the present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network-coupled computer systems so that the computer readable code is stored and executed in a distributed fashion.

According to an exemplary embodiment of the present invention as described above, when web browsing is performed, by using the table structure of a web page, the number of hyperlinks, bookmark information and/or hyperlink information set in advance by the user, and/or information set in advance according to the usage pattern of the user, including link information on links the user accessed recently, identification information is selectively allocated and displayed so that a hyperlink can be selected by using the displayed identification information. By doing so, even though the number of hyperlinks included in the web page may be numerous, a desired hyperlink can be selected easily and quickly, and additionally, management of hyperlinks and allocated identification information can be performed conveniently.

Furthermore, even when the number of hyperlinks included in a web page is numerous, a hyperlink in a web page can be selected easily and quickly by simplified button control in an electronic appliance using an input unit having a limited number of buttons, such as a TV or a mobile phone.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in a descriptive sense only and not for purposes of limitation. Therefore, the scope of the invention is defined not by the detailed description of the exemplary embodiments of the present invention but by the appended claims and their equivalents, and all differences within the scope will be construed as being included in the present invention.

What is claimed is:

1. A web browsing method comprising:
    redefining a plurality of regions of a web page based on a number of hyperlinks in each of the plurality of regions;
    displaying the web page including identification information allocated to each of the plurality of regions;
    if one region among the plurality of regions is selected based on the identification information displayed on the web page, displaying a web page with hyperlinks in the selected region; and
    if hyperlink selection information is inputted based on the web page with the hyperlinks, moving from the web page with the hyperlinks to data connected to a hyperlink corresponding to the selection information,
    wherein the redefining the plurality of regions of the web page comprises grouping a region in which the number of hyperlinks is equal to or less than a predetermined value together with at least one adjacent region in order of increasing number of hyperlinks included in each region.

2. The method of claim 1, wherein, if one region is selected among the plurality of regions, deleting the identification information allocated to each of the plurality of regions.

3. The method of claim 2, wherein the web page with the hyperlinks comprises:
    identification information allocated to each of the hyperlinks in the selected region; and hyperlink information,
    wherein the hyperlink selection information is one of identification information allocated to the respective hyperlinks.

4. The method of claim 3, wherein the identification information allocated to each of the plurality of regions and the identification information allocated to each of the hyperlinks are allocated by a web server providing the web page, and
wherein the web page is displayed with the identification information, based on a result of analyzing identification information tags of the web page provided by the web server.

5. The method of claim 1, wherein the web page is displayed by an electronic appliance comprising an information input unit having a plurality of buttons and a display unit.

6. A web browsing method comprising:
dividing a web page into a plurality of regions based on a table structure of the web page;
determining a specific hyperlink among hyperlinks in the web page;
displaying the web page including identification information allocated to each of the plurality of regions and the specific hyperlink; and
if a hyperlink is selected based on the web page with the hyperlinks or the specific hyperlink is selected based on the identification information of the specific hyperlink displayed on the web page, moving from the displayed web page to data connected to the selected hyperlink,
wherein the specific hyperlink is determined based on information set in advance according to a hyperlink usage pattern of a user,
wherein the identification information allocated to the plurality of regions and the identification information allocated to the specific hyperlink are defined in forms different from each other,
wherein the web page with the hyperlinks comprises:
identification information allocated to each of the hyperlinks in the selected region; and hyperlink information, and
wherein the hyperlink is selected using the identification information allocated to each of the hyperlinks,
defining the plurality of regions of the web page based on a number of hyperlinks in each of the plurality of regions,
wherein in the displaying of the web page, the web page with identification information allocated to each of the plurality of defined regions and the specific hyperlink is displayed, and
wherein in the defining of the plurality of regions, a region in which the number of hyperlinks is equal to or less than a predetermined value is grouped with at least one adjacent region and the at least one adjacent region is determined in order of increasing number of hyperlinks in each region among adjacent regions.

7. The method of claim 6, wherein the identification information allocated to the plurality of regions and the identification information allocated to the specific hyperlink are defined in forms different from each other.

8. A web browsing method comprising:
defining identification information tags for a plurality of regions of a web page to be transmitted from a web server to a web client, the plurality of regions being redefined based on a number of hyperlinks in each of the plurality of regions; and
transmitting the web page with the defined identification information tags to the web client in order to display the web page including the defined identification information tags on the web client,
wherein the plurality of regions of the web page are redefined such that a region in which the number of hyperlinks is equal to or less than a predetermined value is grouped with at least one adjacent region and the at least one adjacent region is determined in order of increasing number of hyperlinks in each region among adjacent regions.

9. The method of claim 8, further comprising:
in relation to hyperlinks in each of the plurality of regions, the web server defining the identification information tag of each of the hyperlinks in each of the plurality of regions.

10. A web browsing system comprising:
a web server; and
a web client which accesses the web server,
wherein the web client comprises:
a web browser which outputs a web page in which identification information is allocated to a plurality of regions of the web page redefined based on a number of hyperlinks in each of the plurality of regions, and if arbitrary identification information is inputted, outputs a web page with hyperlinks in a region corresponding to the input identification information, and if one hyperlink is selected based on the web page with the hyperlinks, moves from the web page with the hyperlinks to data connected to the selected hyperlink;
an information input unit which inputs information to select the identification information and the hyperlink; and
a display unit which displays the web page including the identification information, and wherein the plurality of regions of the web page are redefined such that a region in which the number of hyperlinks is equal to or less than a predetermined value is grouped with at least one adjacent region and the at least one adjacent region is determined in order of increasing number of hyperlinks in each region among adjacent regions.

11. The system of claim 10, wherein if the web page with the hyperlinks is output, the web browser outputs a web page with identification information allocated to each of the hyperlinks, and the hyperlink is selected based on the identification information allocated to each of the hyperlinks.

12. The system of claim 11, wherein the web client further comprises a database which stores information according to a hyperlink usage pattern of a user, and wherein the web browser detects a specific hyperlink among the hyperlinks in the web page by referencing the database, and if the web page with the identification information allocated to the plurality of regions is output, the web browser further outputs the web page with identification information for the detected specific hyperlink.

13. The system of claim 10, wherein the web client is an electronic appliance, and wherein the information input unit has a plurality of buttons.

14. A web browsing system comprising:
a web server; and
a web client which accesses the web server,
wherein the web client comprises:
a processor which defines identification information tags for a plurality of regions of a web page, the plurality of regions being redefined based on a number of hyperlinks in each of the plurality of regions; and
a transmission and reception unit which transmits the web page with the defined identification information tags to the web client in order to display the web page including the identification information on the web client,
wherein the plurality of regions of the web page are redefined such that a region in which the number of hyperlinks is equal to or less than a predetermined value is grouped with at least one adjacent region and the at least one adjacent region is determined in order of increasing number of hyperlinks in each region among adjacent regions.

15. The system of claim 14, wherein the web client comprises an electronic appliance comprising:
an information input unit having a plurality of buttons; and
a display unit.

16. A web browsing system comprising:
a web server device which defines identification information tags for a plurality of regions of a web page, the plurality of regions being redefined based on the number of hyperlinks in each of the plurality of regions, and transmits the web page including the identification information tags defined for respective hyperlinks in the regions; and
a web client device which displays a web page including identification information allocated to the plurality of regions and identification information allocated to the hyperlinks, by analyzing the identification information tags in the web page received from the web server and performing web browsing according to the identification information,
wherein the plurality of regions of the web page are redefined such that a region in which the number of hyperlinks is equal to or less than a predetermined value is grouped with at least one adjacent region and the at least one adjacent region is determined in order of increasing number of hyperlinks in each region among adjacent regions.

17. The system of claim 16, wherein the web client device is an electronic appliance comprising:
an information input unit having a plurality of buttons; and
a display unit.

18. A web browsing system comprising:
a web server which transmits a web page in which a plurality of regions of the web page are redefined based on a number of hyperlinks in each of the plurality of regions; and
a web client which displays the web page including identification information allocated to the plurality of regions of the web page received from the web server,
wherein if one region is selected based on the identification information displayed on the web page, the web client displays the web page with identification information allocated to each of the hyperlinks in the selected region,
wherein if one identification information item allocated to the hyperlinks is inputted, at least one of the web server and the web client moves from the displayed web page to data connected to the hyperlink corresponding to the input identification information, and
wherein the plurality of regions of the web page are redefined such that a region in which the number of hyperlinks is equal to or less than a predetermined value is grouped with at least one adjacent region and the at least one adjacent region is determined in order of increasing number of hyperlinks in each region among adjacent regions.

19. The system of claim 18, wherein the web client comprises an electronic appliance comprising:
an information input unit having a plurality of buttons; and
a display unit.

* * * * *